United States Patent

[11] 3,547,244

[72] Inventors Donald J. Fergle
St. Clair Shores;
Dale K. Benedict, Royal Oak, Mich.
[21] Appl. No. 763,784
[22] Filed Sept. 30, 1968
[45] Patented Dec. 15, 1970
[73] Assignee Eaton Yale & Town, Inc.
Cleveland, Ohio
a corporation of Ohio

[54] SLEEVE CLUTCH
15 Claims, 7 Drawing Figs.
[52] U.S. Cl. .................................................. 192/74,
192/80, 192/88
[51] Int. Cl. ..................................................... F16d 11/06,
F16d 13/12
[50] Field of Search .......................................... 192/74, 80,
88(B), 79; 188/152(.86)

[56] References Cited
FOREIGN PATENTS
222,029  9/1924  Great Britain .................  192/88(B)
630,719  6/1936  Germany .......................  192/88(B)

*Primary Examiner*—Allan D. Herrmann
*Attorney*—Woodhams, Blanchard and Flynn

ABSTRACT: A torque transferring device having a first member of circular cross section with axially spaced annular sealing means projecting radially therefrom and a passageway communicating from a point exteriorly of the first member to a zone between the pair of sealing means. A radially flexible friction member is received between the sealing means and positively arranged for rotation with said first member, the axial edges of said friction member being sealingly engaged with said sealing means to define with sealing means a fluid-restrictive chamber around said zone. A second member of circular cross section is concentrically located with respect to the first member, mounted for relative rotation therewith, and having a surface arranged in close proximity to and extending the full axial length of, an opposed surface of the radially flexible friction member so that when the passageway and the fluid-restrictive chamber is supplied with a fluid under pressure, the radially flexible friction member will move into engagement with the second member. The sealing means minimizes the flow of fluid out of the fluid-restrictive chamber past the edges of said friction member.

INVENTORS
DONALD J. FEAGLE
DALE K. BENEDICT
BY
Woodhams, Blanchard & Flynn
ATTORNEYS

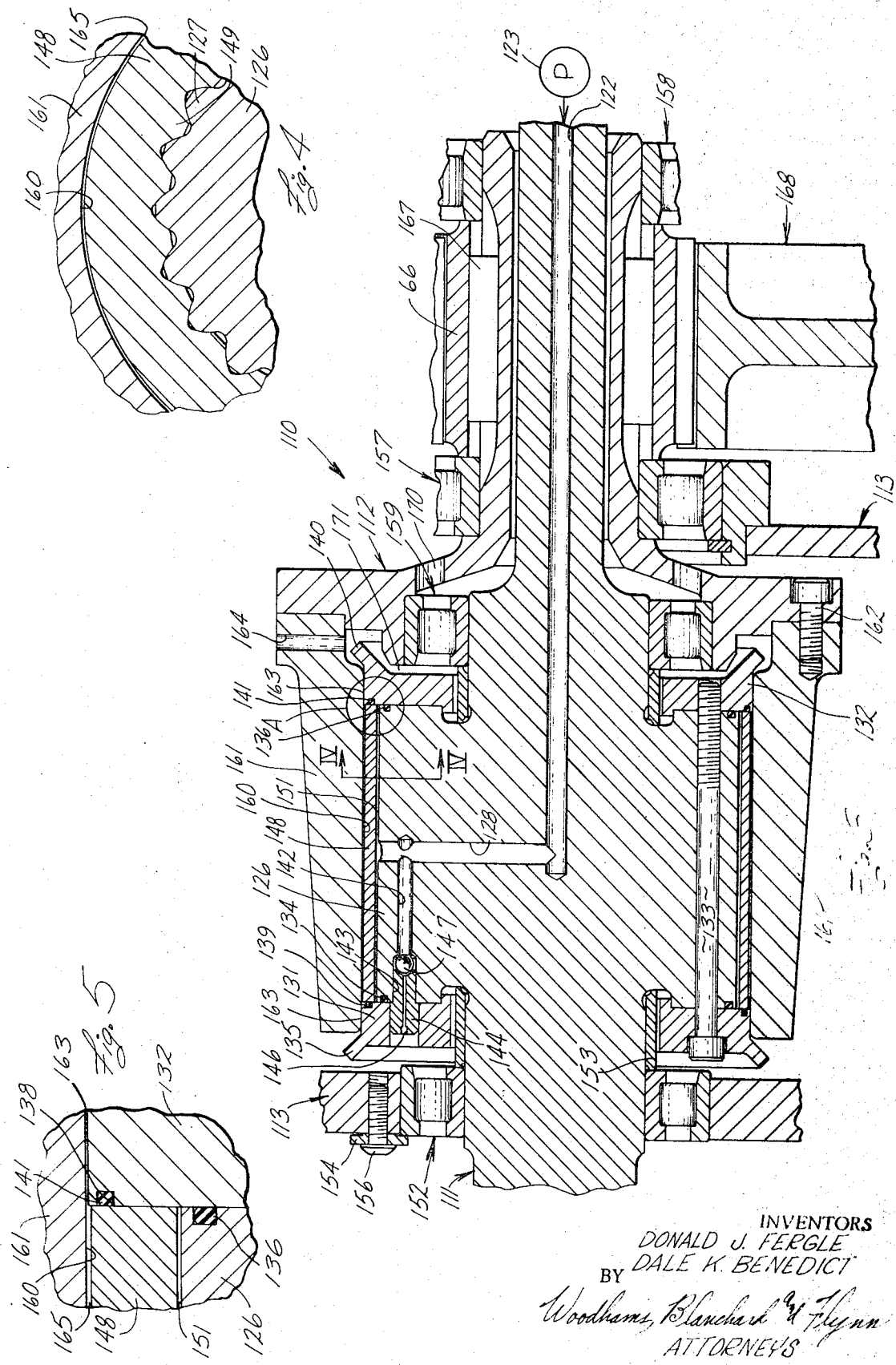

SLEEVE CLUTCH

FIELD OF THE INVENTION

This invention relates to a torque transferring device, and more particularly, relates to such a device for use with parts moving at high rotative speeds with respect to each other and wherein an annular radially flexible friction member is arranged in nonrotatable relationship with one of said members and is further arranged to move radially in response to a fluid pressure toward and into frictional engagement with the other of said members.

BACKGROUND OF THE INVENTION

The design of torque transferring devices, both brakes and clutches, for high-speed use, such as use with an automotive turbine, is one which has faced engineers for a long period of time and has, insofar as we are aware, never been satisfactorily solved. While there are large numbers of such devices, for example, clutches, which work to a high level of overall effectiveness at relatively low speeds, such as up to 5000 r.p.m., all of them insofar as we are aware cannot e be operated at turbine speeds, such as 30,000 r.p.m., without the severe danger of destruction.

In most instances with which we are acquainted, this problem has been met by gearing down the output of the turbine to more conventional speeds and applying a torque transferring device, usually a clutch, to the low-speed side of such gearing. However, this method of dealing with the problem requires an expensive and heavy group of gears on the output shaft of the turbine and thus increases the expense of same and tends to affect adversely the already objectionable tendency of a turbine to respond slowly to changes in fuel supply.

In attempting to meet the aspect of this problem relating to clutches, some interest has been shown in the use of clutches having an annular, radially flexible, sleeve which may be driven by one of a pair of concentric members and be moved radially under a fluid pressure into engagement with the other such of such pair. While such clutches are known, and a clutch of this type is suggested in the patent application of Sidney Oldburg, Donald J. Fergle and David P. Haas, U.S. Pat. Ser. No. 551,446, filed May 19, 1966, now U.S. Pat. No. 3,412,625, assigned to the same assignee as the present invention, nevertheless, such clutches as previously known have certain limitations which in turn limit the effectiveness of the entire unit of which they are a part. For example, where the sleeve moves radially outwardly for effecting a clutching operation, it will respond to centrifugal force and in some instances be thereby urged into engagement with the driven member of the clutch system and impose a drag thereupon. In other instances such as in some types of disc clutches, where the clutch unit is of substantial size, it requires a substantial mechanical movement to effect clutch engagement and thereby requires the flow of a large amount of fluid to engage the clutching members. As a result, an undesirable time lag may occur in the operation of such clutch.

Further, in presently-known clutching devices of this type, and including the one illustrated in said U.S. Pat. Ser. No. 551,446, utilizing a radially flexible sleeve, same is tightly clamped at its axial ends to the clutch member with which it is associated. As a result, when fluid pressure is introduced to the system to effect a clutching (or braking) operation, only the central portion of said sleeve is permitted to effect the desired radial movement, inward or outward as the case may be, and as a result only such part of said sleeve will engage the driven member of the torque transferring device. This requires a larger unit than would be required if the entire sleeve could be brought into engagement with the driven member of the device and, further, it tends to concentrate the wear on the radially flexible sleeve into the central portion thereof.

It is therefore desirable, in furtherance of the objectives set forth in said U.S. Pat. Ser. No. 551,446 as well as to provide high-speed clutches or brakes for other uses, to provide a clutch or brake structure capable of operating at turbine speeds, such as 30,000 r.p.m., but which will correct the problems set forth above as well as others which have been observed with clutches or brakes of the prior art when applied to high-speed uses.

Accordingly, the objects of this invention include:

1. To provide a torque transferring device capable of operating at high rotative speeds, such as the speeds encountered at the output shaft of gas turbines used in automotive applications, for example, 30,000 r.p.m.

2. To provide a torque transferring device, as aforesaid, which will be small and compact while yet capable of a high level of operation.

3. To provide a torque transferring device which is of a small and compact construction and yet effective in conducting the heat away from the engageable components to thereby increase the life of such device.

4. To provide a torque transferring device, as aforesaid, utilizing an annular radially flexible friction member mounted for rotation with the input member and wherein said flexible friction member is pretensioned to fit onto the input member to compensate to a predetermined extent for the effect of centrifugal forces developed on said friction member when the input member is being driven at a high rotational speed.

5. To provide a torque transferring device, as aforesaid, wherein the full axial width of the radially flexible friction member is movable radially and substantially uniformly into engagement with the output member so that the engaging surface of the friction member will wear evenly to thereby increase the life thereof and lower the frequency at which said sleeve must be replaced.

6. To provide a torque transferring device, as aforesaid, wherein a check valve is utilized to remove the fluid from the energizing side of the radially flexible friction member so that any pressure developed on the fluid by centrifugal force will be relieved from the energizing side whereby the pretensioned fit of the friction member on the input member will alone be sufficient to prevent same from dragging on the drum and high rotational speeds.

7. To provide a torque transferring device, as aforesaid, wherein the axial ends of the radially flexible friction member sealingly engage sealing members, which sealing members permit the radially flexible member to move radially over the full axial width thereof.

Other objects and purposes of this invention will be apparent to persons acquainted with torque transferring devices of this general type upon reading the following specification and inspecting the accompanying drawings, in which:

FIG. 3 is a longitudinal, sectional view of a further clutch unit embodying the invention and designed particularly for connecting a gear of relatively small diameter to a shaft.

FIG. 4 is a sectional vie taken along the line IV–IV of FIG. 3.

FIG. 5 is an enlarged showing of an encircled portion A in FIG. 3.

Figure 1:
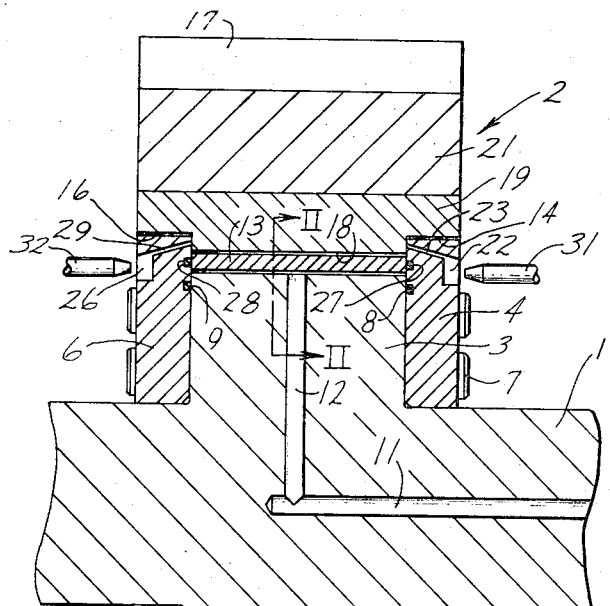
FIG. 1 is a longitudinal sectional view of a clutch unit embodying the invention.

Certain terminology will be used in the following description for convenience in reference only and will not be limiting. The words "up," "down," "right" and "left" will designate directions in the drawings to which reference is made. The words "in" and "out" will refer to directions toward and away from, respectively, the geometric center of the device and designated parts thereof. Said terminology will include the words above specifically mentioned, derivatives thereof and words of similar import.

SUMMARY OF THE INVENTION

The objects and purposes of the invention are met by providing a torque transferring device having concentric and axially overlapping input and output members. A radially flexible friction member is concentric with both input and output members and is arranged for rotation with one of said members. Said friction member is preferably pretensioned toward the inner of said members so that the pretensioning will oppose the effect of centrifugal force exerted thereon when said friction member is driven at a high rotational speed to thereby minimize the otherwise adverse effects of such centrifugal force. Axially facing and spaced edge portions on said one member sealingly engage corresponding axially facing surfaces on the flexible friction member to define a fluid-restrictive chamber between the friction member and said one member the full axial length of that surface of the friction member which is opposite said chamber being opposed by a cooperating surface of the other of said input and said output members. Thus, upon application of a pressurized fluid to the fluid-restrictive chamber, said sealing means will restrict the flow of fluid past the axial facing edges of said friction member and said fluid will cause a radial movement of the friction member away from said one member and into engagement with the other member to thereby cause the input and output members to become frictionally connected to one another.

DETAILED DESCRIPTION

Referring first to FIG. 1, there is shown a shaft 1 which may for illustrative purposes be considered as a rotatable shaft and a fixed or rotatable gear 2 mounted for cooperation therewith as hereinafter described in more detail. Said shaft 1 is provided with an annular projection or hub 3 at each axial end of which are fixed annular plates or rings 4 and 6. Said plates may be affixed in any convenient manner such as by screws of which one is indicated at 7. Suitable sealing means such as O-rings 8 and 9 may be placed between the plates and the hub for preventing leakage of pressure fluid therebetween from the hereinafter-mentioned pressure chamber. An axial passageway 11 is provided through said shaft 1 which connects to a radial passageway 12. The axial passageway 11 may be supplied supplied with pressure fluid, such as oil, in any convenient manner (not shown) and the radial passageway 12 delivers said oil to the periphery of the hub 3.

A radially expansible friction sleeve or member 13 is of uniform radial thickness in an axial direction throughout its full longitudinal extent and is of uniform radial thickness in a circumferential direction excepting for the irregularities resulting from the hereinafter-mentioned splines or corrugations provided for driving purposes. Said sleeve 13 encircles the hub 3 and in this embodiment where, as set forth hereinafter, the sleeve 13 is to expand radially outwardly, said friction member is arranged close to but not necessarily in contact with the peripheral surface of the hub 13. Preferably, however, in order to minimize the effects of centrifugal force, said friction member 13 will be pretensioned to engage the peripheral surface of said hub 3 with a substantial force when the apparatus is in an at-rest condition. The amount of pretensioning is so chosen with respect to the expected operating conditions for the equipment and the diameter of the friction member 13 that said pretensioning force will be substantially balanced under normal operating conditions by the centrifugal force effective on said friction sleeve 13 in order that said friction sleeve will continue to contact said peripheral surface but only lightly. Thus, a positive force, but preferably only a very small positive force, will be required to disengage said friction sleeve 13 from the periphery of the hub 3.

Figure 2:
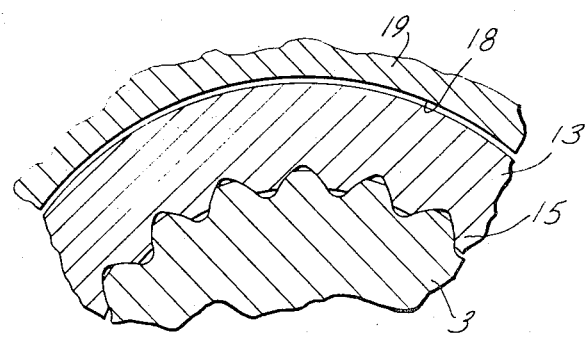
FIG. 2 is a fragmentary section taken on the line II–II of FIG. 1.

The friction sleeve 13 may be made of any material having a high coefficient of friction, a good heat resistance and a sufficient elasticity to stretch as required. One effective material for this purpose is a phenolic-asbestos material having a modulus of elasticity of about $5 \times 10^6$ or $6 \times 10^6$ sold under the trademark "PYROTEX" by Raybestos-Manhattan, Inc. of Bridgeport, Conn. Suitable means, such as the splines or corrugations indicated generally at 15 in FIG. 2, are provided for effecting a positive driving relationship between the hub 3 and the friction member 13 in all radial positions of the sleeve 13 but without interferring with the radial movement hereinafter described between said friction member 13 and said hub. Said corrugations 15 are, however, made as small as possible without losing said driving function in order that the sleeve will have as nearly as possible a uniform radial thickness in the circumferential direction.

The member which is to be frictionally related to the shaft 1, in this instance a load carrying device such as a gear ring 2, is arranged to encircle the friction member 13 and is mounted in any manner to prevent relative axial movement therebetween. In this instance, the plates 4 and 6 are received into suitable recesses 14 and 16 with such clearances that the gear 2 is accurately supported concentrically with the shaft 1 but appreciable axial movement with respect thereto is positively prevented. Said gear 2 is then provided with teeth of which one is indicated at 17 as desired. The inner surface 18 of said gear 2 is placed as close as possible to the friction member 13 when same is in its normal operating position but preferably not in actual contact therewith (unless for some reason such as in certain transmission uses some drag between the shaft 1 and the gear 2 is desired even when the clutch is disengaged and in such case the pretensioning can be diminished or omitted as desired).

In this embodiment the inner portion 19 of said gear is made of a good heat-receiving material, such as phosphor-bronze or chromium-copper, whereas the outer portion 21 of said gear is made from any material appropriate for gear tooth construction, such as steel. The inner and outer portions 19 and 21 may be fixed together in any convenient manner such as by being provided with axially arranged interfitting splines or by welding or brazing. An annular lubricant channel 22 is provided in the exposed face of the end ring 4 and a plurality of passageways of which one is illustrated at 23 are arranged uniformly and circumferentially around said end ring 4 for connecting the channel 22 to the inner surface of said end ring 4. Preferably said passageways 23 will angle radially outwardly as shown to utilize centrifugal force for conducting lubricant from the channel 22 to the inner surface of the end ring 4, the passageway 23 meeting the inner face of the end ring 4 at a point radially outwardly of the surface 18.

A similar lubricant channel 26 is provided on the exposed face of the end ring 6 and corresponding passageways of which one is indicated at 29 are provided between the channel 26 and the inner surface of the end ring 6, the passageway 29 meeting the inner face of the end ring 6 at a point radially outwardly of the surface 18.

Suitable sealing means, such as the O-rings indicated at 27 and 28, are provided for sealing the axial ends of the friction member 13 with respect to the adjacent inner surfaces of the end rings 4 and 6.

The load carrying device 2, whether gear, pulley or other means, is desirably, though not necessarily, arranged so that its axial center is in radial alignment with the axial center of the friction member 13. Thus, the center of load applied by said friction member is radially aligned with the center of said load transmitting device 2 by which good balance and stability of the parts are obtained. However, it will be recognized that the concentric arrangement of the parts will provide a sufficient stability that if other design reasons require that the power transmitting device 2 be axially offset from the friction member 13, as illustrated in the embodiments of FIGS. 3—7, the design can be modified accordingly without departing from the broader concepts of the invention and without losing the stability and reliability required in a device of this type.

OPERATION

Continuing to consider the above-described device as intended for clutching the gear ring 2 to the shaft 1, and continuing to assume that no drag is desired between said gear ring and the shaft when same are in an unclutched relationship to each other, the parts will be so dimensioned that in the unclutched position, the gear 2 will ride on the end rings 4 and 6 concentrically with the shaft 1 but out of contact with the friction member 13. Further, said friction member 13 will preferably be sufficiently pretensioned that even at its operating speed, it will remain in firm, though preferably light, contact with the periphery of the hub 3. Pressure fluid, referred to hereinafter as oil, will be supplied by any convenient means illustrated schematically by nozzles 31 and 32 to the oil channels 22 and 26, respectively, from which said oil will flow in response to centrifugal force developed thereon by the rotation of the shaft 1 through the connecting passageways illustrated by the passageways 23 and 29 into the space between the end rings 4 and 6 and the opposed surfaces defining the recesses 14 and 16. This will maintain adequate lubrication between said end rings and said opposed surfaces of the gear and thereby permit relative rotation between the shaft and the gear while said parts are in an unclutched condition. It would be apparent that although no bearings are expressly shown between the gear ring 2 and the end plates 4 and 6, such may be supplied in any conventional manner if desired.

Further alternatively as above indicated, if for any reason it is desired that some drag exist between the gear ring 2 and the shaft 1 when the parts are in their unclutched condition, the amount of pretensioning provided for the friction member 13 will be chosen so that at the normal operating speed of the shaft 1 the centrifugal force applicable to the friction member 13 will be such as to expand same outwardly into the desired engagement with the surface 18.

When it is desired to engage the shaft 1 with the gear 2, suitable pressure is introduced into the passageway 11 which then travels through the passageway 12 and enters the zone between the friction member 13 and the opposed peripheral surface of the hub 3. Even though said friction member 13 is initially in direct contact with the peripheral surface of the hub 3, oil exiting from the passageway 12 will quickly penetrate between the friction member and the hub throughout the full circumference thereof whereby to apply a radially directed outward force stretching the friction member and causing same to frictionally engage the surface 18. If desired, a plurality of passageways corresponding to passageway 12 may be provided in the hub 3 for accelerating the penetration of pressure fluid between the friction member 13 and said hub and for insuring that said pressure fluid is introduced uniformly therebetween. The seals 8 and 9 prevent any appreciable amount of said pressure fluid from penetrating radially inwardly between the end plates 4 and 6 and the hub 3 and the sealing means 27 and 28 insure that no appreciable amount of said pressure fluid will escape outwardly between the friction member 13 and the end plates 4 and 6.

Thus it will be observed the the entire axial length of friction member 13 will be urged radially outwardly against the surface 18 for effecting a suitable friction connection between the gear 2 and the shaft 1. Its radial thickness being axially and circumferentially uniform (actually only substantially uniform circumferentially due to the driving corrugations 15) throughout its full length insures that it bears substantially simultaneously and uniformly throughout its length and circumference against the surface 18. The extent of the radial outward movement of the friction member 13 is of course insufficient to release it from the splines 15 in any likely radial position of the friction member 13.

The heat receptive material 19 provides a heat sink for absorbing the heat generated by the frictional contact between the friction member 13 and the surface 18. This prevents overheating of either the friction member 13 or the gear structure 21.

Release of the fluid pressure introduced into the passageway 11 will permit the normal resiliency of the friction member 13 to return it to its contracted position and said clutch is immediately disengaged.

It will be apparent that under certain conditions the part indicated herein as the gear 2 may be a shaft or other part into which pressure fluid may be introduced. In such case, it will be evident that the parts may be reversed but in such case no pretensioning will be necessary or useful and pressure fluid is introduced at the radial outward side thereof for contractingly engaging the outer peripheral surface of the hub 3.

It will be further recognized that in view of the foregoing that either of the parts 1 and 2 may be nonrotatively mounted or mounted for rotation at a different rate of speed than that of the other part whereby the friction member 13 and parts associated therewith will function as a brake. However, the structure and operation of said parts will be essentially the same as above described in connection with the operation as a clutch and accordingly, no specific further detailing is needed.

MODIFICATION OF FIGURES 3—5

The foregoing was of course directed toward structure wherein the encircling portion 2 was large enough to enable the entire clutch structure to be placed therewithin. In other instances where, continuing to use a gear to illustrate the invention, the gear is of diameter too small for the clutch structure to be placed therewithin, the structure shown in FIGS. 3—5 will be utilized. Thus, turning now to FIG. 3, the clutch units 110 illustrated therein comprises an input member 111 and an output member 112. The input member 111 and the output member 112 are mounted for relative rotation with respect to the frame 113 and to each other.

The input member 111 has a hub 126 of enlarged diameter, said hub having a plurality of splines 127 on the outer periphery thereof. A pressure creating device 123 of any convenient sort is connected through a central axial passageway 122 and a radial passageway 128 to the outer periphery of the hub 126.

A pair of axially spaced ring members 131 and 132 are secured to the axial facing sides of the hub 126 by a plurality of bolts 133. A seal, here an O-ring, 134 is provided between the ring 131 and the hub 126. A seal 136, here also an O-ring, is provided between the ring 132 and the right side of the hub 126. The purpose of this sealing arrangement will be explained in more detail hereinbelow. The ring members 131 and 132 extend radially beyond the peripheral surface of the hub 126 and each ring member 131 and 132 has sealing-ring grooves (of which one appears at 138 in FIG. 5) adjacent the outer periphery thereof on opposing surfaces thereof. Suitable sealing rings, as O-rings 139 and 141, are received in the grooves. Slingers 135 and 140 are located on the outer periphery of the rings 131 and 132, respectively.

A passageway 142 in the hub 126 is in fluid communication with the passageway 128 and extends axially away therefrom. The left end 143 of the passageway 142 is enlarged and has a plug 144 secured therein in any convenient manner such as by a press fit which has an orifice 146 through the center thereof. A ball element 147 is provided between the right end of the plug 144 and the left end of the passageway 142 so that the opening between the passageway 142 and the orifice 146 is regulatable by the ball element 147. That is, when the ball element 147 is moved radially outwardly, the passageway 142 is in communication with the orifice 146 in the plug 144.

A radially flexible friction member or sleeve 148 having splines 149 on the radially inner surface thereof which fit between the splines 127 on the input member 111 is sleevably mounted on the hub 126 and rotatable therewith. Said splines 149 are of sufficient radial extent that they engage each other in both the contracted and expanded condition of the friction member 148. The friction member 148 is preloaded or pretensioned onto the hub 126 by providing that the diameter of the friction member 148 is slightly less than the outer diameter of the hub 126. The friction member 148 is then press-fitted onto the drive splines 127 on the hub 126. The axially facing edges of the friction member 148 engage the O-rings 139 and 141 on the ring members 131 and 132, respectively. Thus, when the sleeve 148 expands radially due to centrifugal force, there appears a zone 151 defined by the hub 126, the friction member 148, the seals 134, 136 and the seals 139, 141.

In this particular embodiment, the input member 111 is supported for rotation relative to the frame 113 by a bearing 152. The bearing 152 is spaced axially leftwardly of the radially outwardly extending hub 126 by a spacer sleeve 153. Leftward axial displacement of the bearing 152 is prevented by a washer 154 which overlaps the left axial facing surface of the outer race of the bearing 152, said washer being secured to the frame 113 by a screw 156.

The output member 112 is supported for rotation relative to the frame 113 by bearings 157 and 158. In this particular embodiment, the output member 112 is concentric with and encircles the input member 111. A bearing 159 is located between the input and output members 111 and 112 for rotatably supporting the members relative to one another. An annular drum member 161 is secured to the output member 112 by a plurality of screws 162. The drum member 161 encircles the radially flexible friction member 148 and in this embodiment at least portions of the ring members 31 and 32 positioned adjacent the end thereof. A gap 163 (FIG. 3) exists between the radially inner surface 160 of the drum member 161 and the radially outer surfaces of the ring members 131 and 132. A clearance 165 exists between the friction member 148 and the drum 161. A plurality of radially aligned openings 164 (FIG. 3) are provided in the drum 161.

Any conventional means indicated schematically merely by the opening 170 are provided for introducing lubricant under at least a light pressure to the bearing 159. The leftward end of said bearing 159 is positioned close to the adjacent surface of the ring member 132 so as to provide a sufficiently narrow passageway 171 therebetween that the centrifugal force developed on lubricant therein by the rotation of the ring member 132 with respect to the output member 112 will effect a flow of lubricant radially outwardly and same will escape through the openings 164. Thus, lubricant is drawn into the bearing 159 and it is drawn thereinto at a rate at least somewhat proportional to the rate of rotation of the input and output members with respect to each other and said bearing 159 is thereby maintained in a good lubricated condition.

The slingers 135 and 140 are caused to project from the respectively opposite and radially outward corners of the end rings 131 and 132 as shown in FIG. 3. The slinger 140 assists the movement of lubricant through the space 171 as above described. In addition, both slingers tend to draw lubricant from the gaps 163 and thereby tend to draw any lubricant escaping past the respective ends of the friction member 148 to prevent same from entering into the zone 165 between said friction member and the surface 160.

An output gear 166, or other load carrying device, may be secured to the output member 112 by a key 167 in a well-known manner. The output gear 166 is engageable with other gearing as desired, such as indicated at 168.

As with the friction member 13 referred to in connection with FIGS. 1 and 2, the friction member 148 is of uniform thickness throughout its axial and circumferential extent to insure both simultaneous and uniform engagement thereof against the surface 160 of the drum member 161. The pretensioning above mentioned may be of such an extent as desired to either entirely prevent contact between the friction member 148 and the surface 160 when the parts are rotating at normal operating speed or, if preferred, such pretensioning can be chosen so as to provide a light drag between said friction member 148 and the surface 160. The friction member 148 is made of any material having a high coefficient of friction, of good heat resistivity and having sufficient stretch to carry out the radial movement necessary to move into frictional engagement with the surface 160. The material may, for example, be the same as that above described in connection with FIGS. 1 and 2.

The clutch drum 161 is made from any material having a high strength, and resistance to fractional wear together with high heat conductivity and specific heat. For example said drum may advantageously be made of a chromium-copper which has a thermal conductivity of 0.0042 b.t.u./in. 2) (sec.) (deg. F.). Unalloyed copper offers low temperatures and stresses but does not offer the surface durability that is available with the much higher strength chromium-copper As to the heat absorbing and conducting function of the drum, it must be thick enough, regardless of strength requirements, to function effectively as a heat sink and to maintain under normal operating conditions the surface of the drum which engages the member 148 at an acceptable temperature. Since it is within normal engineering competence in the light of the foregoing to select the drum thickness necessary to absorb and dissipate the heat anticipated in a particular case, further detailing thereof is unnecessary.

The operation of the device of FIG. 3 will be described in detail hereinbelow for a better understanding of the invention.

The friction member 148 in this embodiment may be considered for purposes of illustration to be rotatively driven in all conditions of operation from the input member 111 through the splines 127 and 149. Application of a fluid pressure to the passageways 122 and 128 by the pressure creating device 123 will cause a fluid pressure to build up in the fluid-restrictive chamber 151. This in turn will cause the friction member 148 to be urged radially outwardly into engagement with the internal surface of the clutch drum 161. Engagement of the friction member 148 with the clutch drum 161 will couple the input member 111 to the output member 112. Thus, the speed of rotation of the output member 112 will be altered to a speed equal to that of the input member.

The friction member 148 being substantially unrestricted at its edges will expand radially outwardly uniformly along the axial width thereof. This particular characteristic is permitted through the use of appropriate seals, here O-rings, 139 and 141 in the ring members 131 and 132, respectively, which slidingly engage the axial facing edged edges of the friction member 148. Thus, as the friction member 148 is moved radially, the axially facing edge surfaces of the friction member 148 will slide on the seals 139 and 141 without losing the seal created therebetween. It is recognized, however, that some fluid will escape between the axially facing edges of the friction member 148 and the seals 139 and 141 but this amount of fluid is minimal. That fluid which does escape is due primarily to the effect of centrifugal force thereon and is drawn through the gap 163 (FIG. 3) as above described. Similarly, the O-rings 134 and 136 substantially prevent the flow of fluid radially inwardly from the fluid-restrictive chamber 151 between the hub 126 and the ring members 131 and 132.

The ball element 147 is also affected by centrifugal force and at high rotative speeds is thrown radially outwardly. This permits a fluid connection between the passageway 142 and the orifice 146 so that any pressure developed within the passageway 128 due to centrifugal force will bleed out through the orifice 146 and eliminate the drag between the friction member 148 and the surface 160 which might be otherwise caused by the action of centrifugal force on pressure fluid within the passageway 128. The diameter of the orifice 146 is large enough to effect sufficient oil flow therethrough to cause the ball 147 to seal but not so large as to prevent the unsealing of the ball by centrifugal force on release of pressure fluid within the passageway 142.

Figure 7:
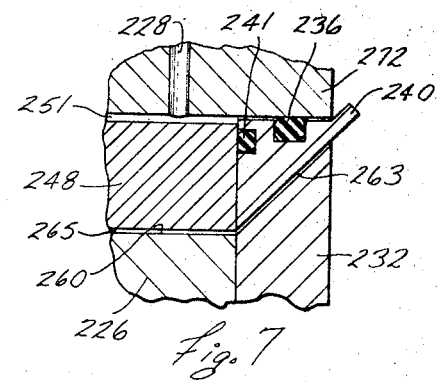
FIG. 7 is a further modification of the clutch unit illustrated in FIG. 1.
Figure 6:
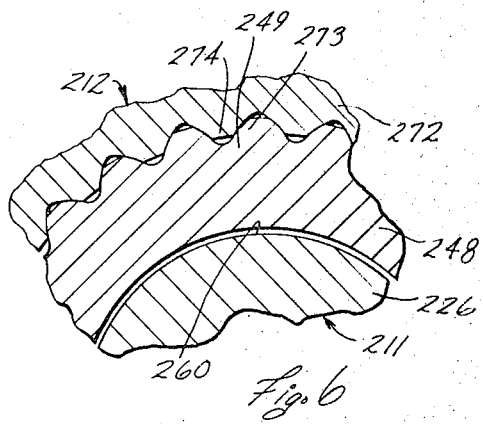
FIG. 6 is a modification of the radially flexible friction member connection in the clutch unit illustrated in FIG. 1.

MODIFICATION OF FIGURES 6 and 7

FIGS. 6 and 7 illustrate a modification of the clutch unit 110 illustrated in FIGS. 3—5 and the numerals of FIGS. 6 and 7 correspond in their second and third digits to the second and third digits of the numerals of FIGS. 3 —5 and indicate corresponding parts. In this particular embodiment, the friction member 248 is secured to the outer member 212 which has a sleeve member 272 encircling and concentric with the hub 226 of the inner member 211. The splines 249 on the friction member 248 are received in the grooves 272 273 between the splines 274 on the sleeve member 272. Thus, upon the introduction of a pressurized fluid through a suitable passageway 228 into the fluid-restrictive chamber 251 between the friction member 248 and the sleeve 272, such fluid will cause the friction member 248 to contract into engagement with the peripheral surface of the hub 226 of the input member 211.

In this embodiment the hub structure 226 will serve as a heat sink in generally the same manner as above described in connection with the heat sink function of the drum 161. Here the ring members 231 and 232 are fixed with respect to the drum 272 and the radially flexible friction member 248 is similarly fixed with respect to the drum 272. Sealing means of which one is shown at 241, here also O-rings, are provided adjacent the opposite axial ends of the friction member 248 for restricting the escape of pressure fluid from the chamber 251 while permitting re radial movement of the friction member 248. Seals such as O-rings should also in this embodiment be provided at 236 to prevent escape of pressure fluid from the chamber 251.

While in some instances above the inner member 211 has been referred to as an input member and the outer member 212 has been referred to as an output member, it will be understood that this terminology is only for convenience and that the power flow may go through the system in either direction in any of the embodiments illustrated in FIGS. 1—7 or in any reasonable modification of any thereof. Further, all of the foregoing apparatus has been described in terms of a clutch between a pair of rotative parts. It will be recognized that the invention may also be used in a brake. In such use the structure will be s essentially the same but the operation will be altered in a manner which will be obvious in light of the foregoing such as making the gear 2 (FIG. 1) fixed as set forth hereinabove and which therefore needs no detailing.

We claim:

1. In a force transmitting device for first and second members mounted for movement with respect to each other, said second member being concentric with said first member, the combination comprising:
   a radially flexible, annular, friction member sleevably mounted with respect to said first member between said first member and said second member and driveable from one of said first and second members;
   spaced edge portions on one of said first member and said second member adapted to sealingly engage the substantially axially facing surfaces of said friction member thereby defining a fluid-restrictive chamber between said friction member and said one of said first member and said second member;
   fluid pressure means and means providing fluid communication from said fluid pressure means to said fluid-restrictive chamber;
   whereby an application of fluid pressure to said fluid communication means will cause a substantially uniform radial movement of all of said friction member and an engagement thereof with the other of said first member and said second member to thereby cause said first and second members to become drivingly connected with one another, said sealing engagement of said spaced edge portions and said substantially axially facing surfaces on said friction member restricting the flow of fluid past said axial facing surfaces of said friction member.

2. The force transmitting device defined in claim 1, wherein said radially flexible friction member is pretensioned on said first member whereby when said clutch is disengaged, the centrifugal effect thereon will be opposed and the otherwise occurring engagement of said friction member with said other of said first and second members will be diminished.

3. The apparatus defined in claim 1, wherein said force transmitting device is a clutch.

4. The apparatus defined in claim 1, wherein said force transmitting device is a brake.

5. A torque transmitting device defined in claim, claim 1, wherein said second member is a power transmitting device such as a pulley or a gear.

6. The device defined in claim 1, wherein said second member is a power transmitting device and the axial center thereof is substantially aligned radially with the center of said friction member.

7. A torque transmitting device for first and second rotatable members, said first rotatable member having a pair of axially spaced annular sealing means projecting radially outwardly therefrom, comprising in combination:
   a passageway in said first rotatable member extending therethrough and opening outwardly to the peripheral surface of said first rotatable member between said pair of sealing means;
   a radially flexible friction member sleevably mounted over said first rotatable member and arranged for rotation therewith, said sealing means adapted to sealingly engage the substantially axially facing surfaces of said friction member;
   a second rotatable member concentric with said first rotatable member and mounted for rotation with respect thereto, said second rotatable member encircling said friction member in close proximity thereto, whereby the inner surface of said second rotatable member is capable of being tightly engaged by said friction member; and
   means supplying fluid pressure to said passageway whereby an application of pressure to the fluid in said passageway will cause all of said friction member to expand radially outwardly substantially unit uniformly into engagement with said second rotatable member, said sealing means preventing the flow of fluid past said axially facing surfaces of said friction member.

8. The torque transmitting device defined in claim 5, wherein said first rotatable member has a plurality of axial serrations on the outer periphery thereof between said annular sealing means; and wherein said radially flexible friction member has axial serrations on the inner surface thereof which are drivingly connected with said serrations on said first rotatable member to prevent a relative rotation therebetween.

9. The torque transmitting device defined in claim 7, wherein said annular sealing means comprises a pair of ring members which project radially outwardly of said first rotatable member and have sealing members connected thereto on the opposed axially facing surfaces thereof;
   wherein said axially facing surfaces of said friction member sealingly and slidingly engage said sealing members to define a fluid-restrictive chamber between said friction member and said first rotatable member; and
   whereby an application of fluid pressure to a said passageway will cause a radial movement of all of said friction member into engagement with said second rotatable member to thereby cause said first and second rotatable members to become drivingly connected with one another, said sealing members restricting the flow of fluid past the edges of said friction member.

10. The torque transmitting device defined in claim 7, wherein said radially flexible friction member is made of a phenolic-abestos material.

11. The torque transmitting device defined in claim 7, wherein said second rotatable member includes a friction drum which overlaps said radially flexible friction member; and whereby an application of a fluid pressure to said passageway will cause a radial movement of all of said friction member into engagement with said friction drum.

12. The torque transmitting device as defined in claim 11, wherein said friction drum is made of a chromium-copper material having a thermal conductivity of 0.0042 b.t.u./ (in.$^2$) (sec.) (deg. F.).

13. A torque transmitting device as defined in claim 7 including first spaced bearing means supporting said second rotatable member and load transmitting means supporting said second rotatable member and load transmitting means arranged on or for rotation with said second rotatable member and located between said spaced bearing means; and further including second spaced bearing means for rotatively supporting said first rotatable member, one of said second spaced bearing means being located between said first rotatable member and said second rotatable member axially beyond said second rotatable men member.

14. The torque transmitting device of claim 13, wherein the first of said second pair of bearings is located closely adjacent the nearest one of said edge portions and wherein introduction means is provided through said first shaft for introducing lubricant into said one of said second set of bearings, whereby the said nearest of said edge portions forms with the adjacent end of said first of said second pair of bearings a relatively narrow channel which expels lubricant radially outwardly and thereby tends to draw lubricant from said introduction means into said one of said second pair of bearing. bearings.

15. The device defined in claim 13, including a flange projecting from said edge portions at their radially outwardly and respectively remote corners, said flanges projecting away from each other and radially outwardly of the outer periphery of said edge portions whereby lubricant escaping past said friction member from said fluid restrictive chamber will be drawn between said edge portions and the adjacent surfaces of said second shaft for maintaining lubrication therebetween and for preventing appreciable travel of said lubricant into the zone between said friction member and the adjacent surface of said second shaft.

UNITED STATES PATENT OFFICE
CERTIFICATE OF CORRECTION

Patent No. 3 547 244      Dated December 15, 1970

Inventor(s) Donald J. Fergle and Dale K. Benedict

It is certified that error appears in the above-identified patent and that said Letters Patent are hereby corrected as shown below:

Column 3, line 73;   5 x 106 or should read ---5 x $10^6$ or--

Column 10, line 74;  transmitting means supporting said second rotatable member and load trans mitting means arranged should read ---transmitting means arranged---.

Column 11, line 6    member axially beyond said second rota table men member should read ---member and the other of said second spaced bearing means being positioned on said first rotatable member axially beyond said second rotatable member.

Signed and sealed this 8th day of June 1971.

(SEAL)
Attest:

EDWARD M. FLETCHER, JR.
Attesting Officer

WILLIAM E. SCHUYLER,
Commissioner of Paten